United States Patent Office 3,467,440
Patented Sept. 16, 1969

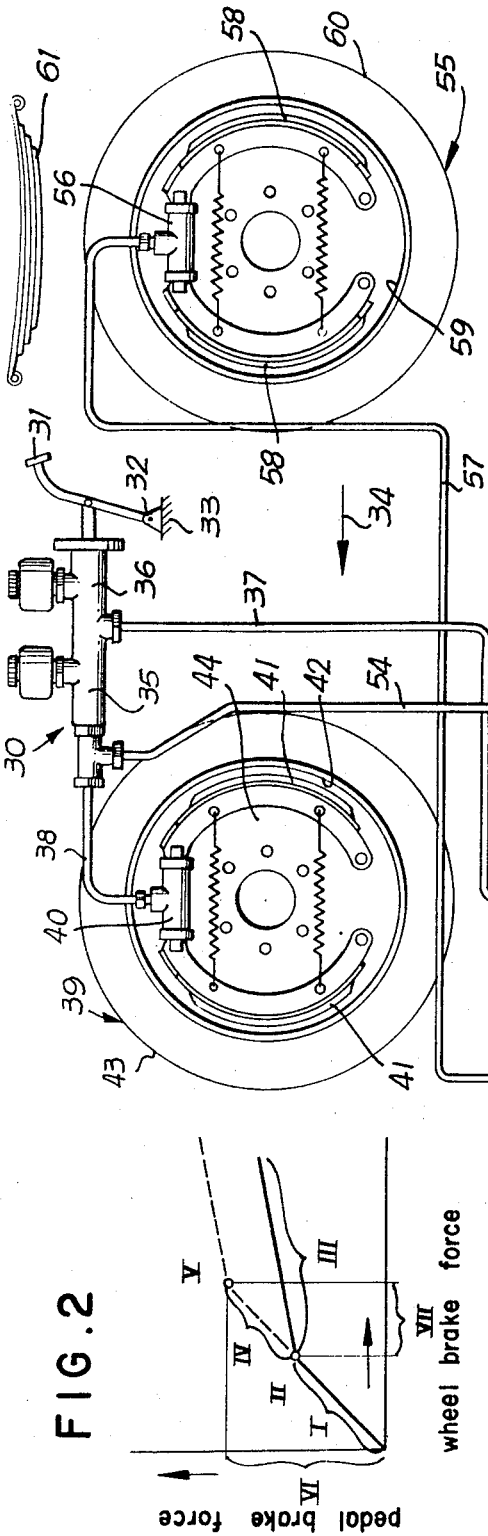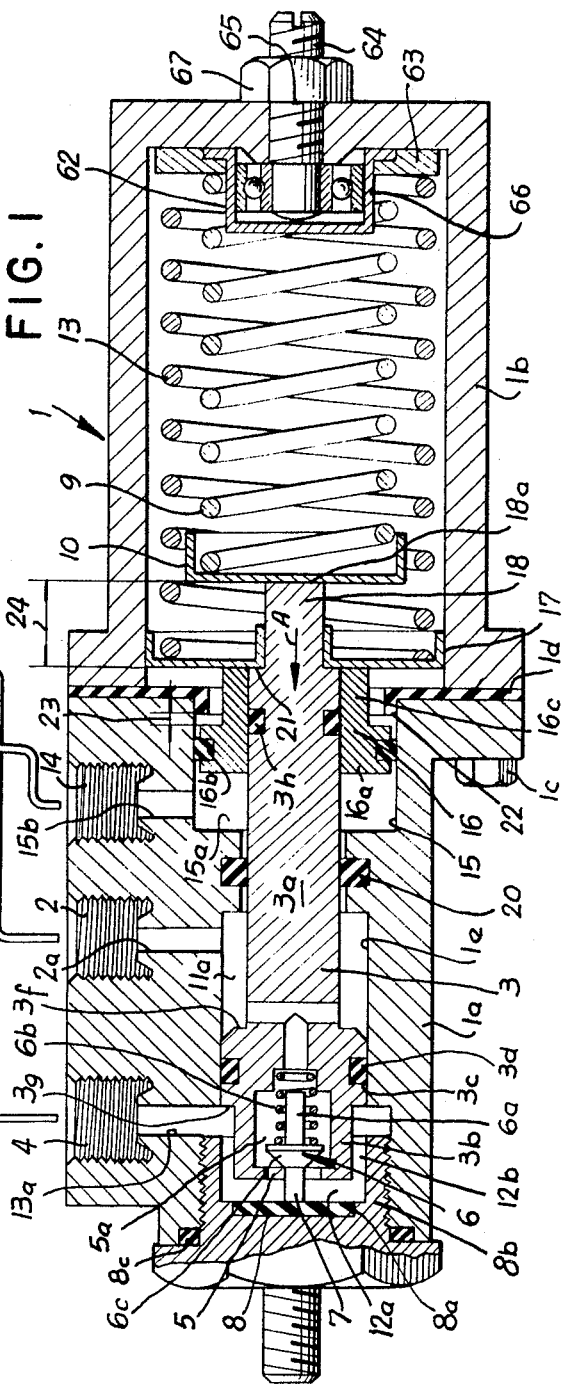

3,467,440
BRAKE-FORCE REGULATOR
Hans Strien, Frankfurt-Bonames, Germany, assignor to Alfred Teves G.m.b.H., Rebstocker, Germany, a corporation of Germany
Filed Sept. 29, 1967, Ser. No. 671,694
Claims priority, application Germany, Oct. 4, 1966, T 32,190
Int. Cl. B60t 13/00, 11/10, 15/46
U.S. Cl. 303—6       9 Claims

ABSTRACT OF THE DISCLOSURE

A dual-network vehicular brake system wherein a tandem master cylinder has one section supplying a fluid network communicating with the wheel-brake cylinders of the front wheel brakes and a second section communicating with the network of the rear wheel brakes, the latter network having a brake-force regulator in which a differential piston has a valve communicating between the master cylinder and the rear wheel-brake cylinder to permit direct pressurization of the latter upon depression of the brake pedal during initial brake operation but effective to decrease the force applied to the rear wheel brakes at a subsequent transition point, the transition point being delayed by a feedback system responsive to the pressure in the front wheel-brake network to maintain a spring out of engagement with this differential piston.

My present invention relates to a brake-force regulator and, more particularly, to a regulating valve in the brake-fluid path between the master cylinder of an automotive brake system and the wheel-brake cylinder thereof designed to vary the brake effectiveness of the rear-wheel brake in accordance with the effectiveness of the front-wheel brake.

In the commonly assigned prior patents No. 3,167,360, No. 3,169,800 and No. 3,233,947 issued to H. Oberthur, there are described manually adjustable or automaitc load-responsive vehicular brake regulators and devices designed to vary the braking effectiveness in accordance with the degree of actuation of the brake pedal and, possibly, in accordance with the load upon the vehicular suspension. In these patents it is recognized that the braking effectiveness must be increased with increasing load to prevent runaway of the vehicle while locking of the brakes, which tend toward skidding, should be avoided. Consequently, the brake system is provided with a valve structure which permits direct fluid transfer between the master-cylinder line and the wheel-brake line during initial periods of actuation of the master cylinder but then interposes a piston in force-transmitting relationship between these lines to reduce the pressure buildup in the wheel-brake line at an inflection point in the brake-force characteristic of this system prior to locking of the wheel brake. In these arrangements, a differential piston exposed to the fluid pressure on the master-cylinder side and on the wheel-brake cylinder side is effective to operate a control valve in this piston which connects the master cylinder and the wheel-brake cylinder, while a regulating spring, whose force determines the location of the transition point, biases this piston to maintain the valve open, the spring being modfied by the vehicle suspension. A brake regulator of this type has a brake-force characteristic which, considered in terms of braking effectiveness plotted against the foot pressure on the brake pedal, provides an inflection, transition or switchover point at which the valve closes so that further pressurization of the wheel-brake cylinder is effected via the force-transmitting piston, this switchover point being characterized by a sharp bend or kink in the characteristic curve whose location therealong may be altered in dependence upon the load on the vehicle wheel to permit control of the transition point in accordance with the axle load of the vehicle. A feedback of fluid pressure is provided to control the stress applied to the spring. To this end, the vehicle suspension may include a pneumatic or hydraulic cylinder whose pressure increases with rising load and which is connected by a fluid line with the spring-biasing means of the brake regulator. In the commonly assigned copending application Ser. No. 668,517 filed Sept. 18, 1967 and entitled "Brake-Force Regulator," Heinrich Oberthur describes and claims a modified brake-force regulator designed to reduce the force transmitted to the wheel-brake cylinder at a predetermined point in the depression of the brake pedal in which the stepped piston exposed to the pressure at the wheel-brake cylinder and the master cylinder is not continuously in sealing engagement with the housing, a throttle valve gradually narrowing the cross-section of fluid communicating around the outer surfaces of the piston and finally terminating it entirely. It has been found that the system eliminates practically all frictional wear of the seals and, moreover, eliminates any sliding contact of the large-diameter step of the system with the wheel of the housing until its friction can no longer be significant with respect to the brake-force characteristic of the regulator. In that system, means can be provided as described earlier for adjusting the spring bodies of the stepped piston as described in the prior patents.

In recent years, it has been proposed to provide so-called dual-network brakes in which a tandem-master cylinder, having at least two sections pressurizable by respective plungers and operable without direct fluid communication therebetween, separately displaces brake fluid through a pair of transmission networks respectively connected to, for example, a set of front-wheel brakes and a set of rear-wheel brakes. Such systems have the advantage that, upon failure in the fluid-transmission line, wheel-brake cylinder or master-cylinder section of one network, the other network remains effective to slow the vehicle.

It is the principal object of the present invention to provide an improved dual-network brake system with brake regulator whereby the effectiveness of the rear-wheel brakes can be increased upon a failure of the front-wheel brakes.

It is another object of this invention to provide a dual-network brake system with improved means for distributing the brake effectiveness between front and rear wheel-brake cylinders so as to place a preponderance of braking effectiveness up the front-wheel brakes, after an initial period of brake operation with the rear-wheel brake at relatively greater effectiveness.

I have found that it is possible to accomplish these objects and others which will become apparent hereinafter in a dual-network brake system embodying some of the principles originally set forth in the aforementioned copending application and the patents cited above. In accordance with the present invention, a dual-network brake system comprises a tandem master cylinder having a pair of individually pressurizable master-cylinder sections communicating with the wheel-brake cylinders of a set of front-wheel brakes and the wheel-brake cylinders of a set of rear-wheel brakes via respective fluid-transmission networks so that, upon depression of the brake pedal, the two networks are so pressurized as to render effective the front and rear wheel brakes. It has been recognized that simultaneous and corresponding pressurization of both wheel brakes is disadvantageous and that optimum braking of an automotive vehicle requires that a preponderance of the brake load be carried by the rear-wheel brake during the initial period of brake operation and that the major brake force should be applied by the front-wheel brake during a subsequent period of brake operation. I have now found that this can be accomplished with the aid of a brake regulator of the general type set forth in the aforementioned patents with modification in accordance with the particular requirements of a dual-network brake as will become apparent hereinafter.

More specifically, I provide in a dual-network brake of the character described, a brake regulator having a differential piston shiftable in a housing and connected in the transmission network of the rear-wheel brake, this differential or stepped piston subdividing a cylinder bore into a working compartment communicating with the master-cylinder section associated with the rear-wheel brakes and a working compartment communicating with the rear-wheel brake cylinder. The differential piston is provided with a valve communicating between these compartments during initial brake operation wherein the differential piston is retained against movement by a spring means determining the transition point in accordance with the principles of the above-cited patents. The effective surface areas of the differential piston are relatively small in the first compartment and relatively large in the second compartment so that the differential force applied to the piston is effective to displace the latter against the spring force and to close the valve, whereupon further force transmission between the master cylinders and the rear brake cylinders is effected via the piston so that the force transmission to the rear wheel brakes is reduced by a factor of the ratio of the small to large effective surface areas. Thus, with continued depression of the brake pedal, the force delivered to the front wheel brakes continues at its original transmission rate while the decreased force transmission to the rear wheel brake renders the former of greater effect during the subsequent braking period.

According to a more specific feature of this invention, a servo piston is provided in the brake regulator which is effective counter to the spring means and normally relieves the spring means in response to pressure in the front-wheel-brake network to establish the normal transition point. When, however, the front-wheel network fails, the servo piston is ineffective and the full force of the spring means is applied to the differential piston, thereby delaying the point at which the valve closes and prolonging direct fluid transmission between the master cylinder and the rear-wheel-brake cylinder. Advantageously, this feedback system comprises a piston axially shiftable in the regulator and coaxial with the differential piston and bearing upon a force-transmitting member to bias it, upon pressurization from the front-wheel network, away from the shoulder of the differential piston, this force-transmitting member constituting a seat for an auxiliary spring coaxially surrounding the regulating spring bearing upon the differential piston. When the front-wheel brake pressure fails, the force-transmitting member is fully coupled with the differential piston.

The above and other objects, features and advantages of the present invention will become more readily apparent from the following description, reference being made to the accompanying drawing in which:

FIG. 1 is an axial cross-sectional view of a brake-force regulator, in accordance with this invention, showing it diagrammatically in relationship to other components of the brake system; and FIG. 2 is a graph diagrammatically representing the brake-force characteristics of the system of the present invention.

In FIG. 1 of the drawing, I show a dual-network brake system which is diagrammatically shown to comprise a tandem master cylinder 30 operated by a brake pedal 31 pivotally connected at 32 to the vehicle chassis 33 whose forward direction is represented by the arrow 34. The tandem master cylinder may be of any conventional type and has, in the usual manner, a pair of master-cylinder sections 35 and 36 connected by respective transmission lines 37 and 38 with respective sets of wheel-brake cylinders. In this embodiment, the dual-network brake has a set of front-wheel brakes generally represented at 39 (only one wheel brake of each set being illustrated) whose wheel-brake cylinders 40 are supplied with hydraulic brake fluid from the network 38. The wheel-brake cylinders 40, when pressurized, bias a pair of generally segmental brakeshoes 41 outwardly against a brake drum 42 connected to the respective front wheel 43 of the vehicle, the brakeshoes 41 and the cylinder 40 being mounted upon a brake shield 44 which is connected to the axle housing in the usual manner. The wheel suspension of the vehicle may comprise a cylinder defining a fluid chamber above a piston connected via a piston rod with the axle housing carrying one of the brake shields. Thus, when the load on the wheels increases, there is a pressure buildup in the cylinder which can be transmitted to the regulator valve as shown, for example, in U.S. Patent No. 3,167,360 to prestress its springs.

The rear wheel brakes 55 (only one shown) comprise wheel-brake cylinders 56 which are supplied with fluid from the network 37 via the regulator valve and a fluid-transmission line 57 connected thereto. The wheel-brake cylinders 56 actuate brakeshoes 58 which can be brought into contact with the brake drum 59 secured to the wheel 60. The suspension is here represented as a conventional leaf spring support 61.

The brake regulator comprises a housing 1 consisting of a valve body 1a and a spring housing 1b sealingly interconnected by bolts 1c via a washer-type seal 1d. The valve body 1a is formed with a port 2 connected to the master cylinder 30 via a line 37. The inlet port 2, supplied with brake fluid under pressure from the master cylinder, communicates with an axially extending bore 1e of the valve body 1a in which a stepped piston 3 is axially displaceable. The stepped piston 3 has a shank portion 3a and a head 3b, the latter being provided with a peripheral groove 3c receiving seal 3d in sliding engagement with the wall of bore 1e. The head 3b of the stepped piston is, moreover, provided with a chamber 5a communicating via a valve passage 5 with the chamber 12a ahead of the piston 3. Chamber 12b, in turn, communicates with the outlet port 4 which is connected via line 57 with the wheel cylinders 56 of the rear-wheel brakes 55. In its left-hand position, the piston 3 abuts upon a plate 8 of sound-cushioning but stiff material mounted in a recess 8a in a plug 8b threaded into the left-hand end of the valve body 1a and clamping a sealing ring 8c thereagainst. A valve member 6 is axially displaceable in chamber 5a and has a shank 6a surrounded by a coil spring 6b which biases valve member 6 into its closed or left-hand position when piston 3 is shifted to the right to bring the stem 7 of the valve member 6 out of engagement with the abutment layer 8. The valve member also has a frustoconical surface 6c engageable with a valve seat formed by the edge 5b of the passage 5 which communicates with chamber 12b via a radial slot 12a in the left-hand end of the piston 3.

The stepped piston 3, whose relatively small effective surface 3f is exposed to the fluid pressure of the master cylinder 30 in the chamber 11a on the right-hand side of the head 3b of the piston, while the relatively large effective surface area 3g is exposed to the fluid pressure in chamber 12b and the wheel-brake cylinder 56, bears at its right-hand end via a stem 18 against a control spring 9 of the helical, compression type within the casing 1b of the housing. The spring 9 is received in a seat 10 of dished configuration which bears against the surface 18a of the stem 18 in the direction of arrow A, i.e. the direction in which the pressure in chamber 11a is effective upon the piston 3. At its other end, the spring 9 is centered on a boss 62 of a flanged seat 63 which is shown in FIG. 1 to rest against the right-hand wall of the casing 1b. The spring 9 can be precompressed, in accordance with this invention, by means for adjusting the position of seat 63 as described, for example, in the patents and patent application mentioned earlier. More specifically, a bolt 64 is threaded into the right-hand end 65 of the casing 1b and carries, via a bearing, a bushing 66 upon which the plate 63 is mounted. A locking nut 67 fixes the bolt 64 in place. Thus, when the bolt 64 is turned into the casing 1b, the bushing 66 lifts the plate 63 away from the right-hand wall of the casing and moves it to the left (FIG. 1), thereby compressing the spring 9 between plate 63 and piston 3.

When hydraulic brake fluid is supplied by the cylinder 30 through inlet port 2, it is delivered via a radial bore 2a to the chamber 11a surrounding the shank 3a of piston 3 at the right-hand side of the head 3b of this piston, the chamber 11a being closed off by an annular seal 20 in sliding engagement with the shank 3a. From chamber 11a, the brake fluid may pass, in the open position of valve member 6, through radial bore 11b behind the head 3b, and through axial bore 11c in this head into chamber 5a and thus past the valve member 6, the port 5 and bore 12a into chamber 12b for delivery to the wheel-brake cylinder 56 via line 57. Chamber 12b is connected to line 57 via a radial bore 13a and the outlet port 4.

The casing 1b also receives a larger-diameter auxiliary spring 13 which coaxially surrounds spring 9 and bears, at its right-hand end, against the flange plate 63 while its left-hand seat 17 is slidable in the casing 1b on the stem 18 and rests against a shoulder 21 therein. In the valve body 1a, a further hydraulic cylinder bore 15 is provided coaxially with the bore 1e but is separated from the latter via the sealing ring 20. The chamber surrounding the stem 3a is represented at 15a and communicates via a radial bore 15b with a port 14 connected by line 54 to a servo center of the fluid-responsive type represented at 50 and generating an increased fluid pressure in chamber 15a with increasing load on the front wheels of the vehicle. The servocontrol piston 16 is slidable in bore 15 and forms a sleeve around the shank 3a adapted to bear upon the spring seat 17 and urge it to the right relative to the piston 3. The head 16a of piston 16 is enageable upon such movement by the inwardly turned abutment flange 22 of washer 1d and has a sealing ring 16b slidably engaging the wall of bore 15. The axially extending narrow portion 16c of this piston 16 passes through the flange portion 22 with clearance, is sealingly engaged by the annular seal 3h of the piston 3, and abuts the spring seat 17. Plate 17 has a stroke as represented at 24 between the point at which it acts against the shoulder 21 and the point at which it engages the spring seat 10 of control spring 9. The valve body 1a is provided between chambers 15a and 11a with a throat 19 receiving the seal 20.

During initial braking movement, the vehicle operator treads upon the pedal 31 to force brake fluid from master-cylinder sections 35 and 36 through lines 37 and 38. The wheel-brake cylinders 40 of the front-wheel cylinders are operated directly in the usual manner. During this period, brake fluid flows via line 37, port 2, radial bore 2a, chamber 11a, force 11b and 11c, valve chamber 5a, orifice 5, transverse bore 12a, chamber 12b, radial bore 13a, outlet port 4 and line 57 to the rear-wheel-brake cylinders 56 unhindered by the valve 6 to actuate the wheel-brake cylinders of both sets of wheels with increasing pressure as the brake pedal is pressed harder. During the initial brake action, the spring 9 holds the stepped piston 3 to the left and there it engages the abutment 8 (in the position illustrated in FIG. 1), the stem 7 of the valve 6 being retained in this position in the open condition illustrated here. Spring 9 is stiffer than spring 6b to ensure that valve 6 will open in the extreme left-hand position of piston 3. Since the effective surface area on the left-hand side of head 3b is greater than that on the right-hand side of this head, there is a hydraulic force 6 to urge the piston 3 to the right against the spring force; this hydraulic force $F = p \times \Delta A$, where $p$ is the pressure in chambers 11a and 12b and $\Delta A$ is the effective surface area difference across the head 3b of piston 3. When the force F, increasing in proportion to the increase of the pressure $p$ delivered by the master cylinder 30, reaches a level determined by the prestress in the stiffness of the regulating spring 9, the differential piston 3 is shifted to the right and thereby (with valve member 6 resting against abutment 8) closes communication between the valve surface 6c and the valve seat 5b between the chambers 11a and 12b. Further force transfer between these chambers causes a rise in the pressure in chamber 12b at a rate, relative to the increase in pressure in chamber 11a determined by the ratio $A_s/A_1$, where $A_s$ and $A_1$ are respectively the small and large effective areas of the piston head 3b as described in the abovementioned patents and application. The pressure delivered to the rear-wheel-brake cylinder thus increases at a slower rate with increasing master-cylinder pressure during the control phase which limits brake locking.

In FIG. 2, wherein the applied brake force is plotted along the ordinate against the wheel-brake force plotted along the abscissa, it can be seen that as the pedal is depressed, the wheel-brake force rises proportionally and at a constant rate during the initial portion of the curve I corresponding to the open position of valve 6 until, at a switchover point at inflection or transition II, force transmission via the piston is effected and further increased in the wheel-brake force with depression of the pedal occurring over the stretch III of the solid left curve with reduced slope and, indeed, with a slope determined by the ratio of the effective surface areas of the piston 3. To this extent, therefore, the assembly operates as a brake-force regulator of the type illustrated and described in the aforementioned patents and patent application.

According to the present invention, however, the brake-force regulator is used as a distributor to apportion the brake force or effect between the front and rear wheel brakes. To this end, the auxiliary spring 13 is provided, which is effective upon the differential piston 3 in the same direction as the control spring 9 and thus augments the latter. The compression spring 13, as noted earlier, coaxially surrounds spring 9 bearing upon the right-hand end of the differential piston 3 via a force-transmitting body in the form of an annular seat 17 and which is axially shiftable upon the stud 18 between the abutment 21 and the spring seat 10 of the spring 9.

As indicated earlier, when the brakes are applied (during the period of brake application represented by portion I of the curve of FIG. 2), the brake force is transmitted directly from the master cylinder 30 via sections 35 and 36 and lines 37 and 38 to the wheel-brake cylinders 40 and 56 which are arranged so that during the initial braking period a greater brake effectiveness is applied to the rear wheels. Only when the transition point II is achieved, does the increasing application of foot pressure to the pedal decrease the braking effectiveness at the rear wheel (graph III) while the previous rate of increase continues at the front wheel brakes. The shift in load from the rear to the front axle is thus compensated by an increase of the braking effectiveness at the front wheels. Another advantage of this system is that a proportionately greater braking force seizes the road surface of high friction at the front wheels without requiring one to limit brake operation on smooth surfaces.

During the initial brake period (I), the pressure at section 36 of the master-cylinder section associated with front-wheel brake cylinder 40 is communicated by line 54, inlet port 14 and radial bore 15b to the chamber 15a in which the annular piston 16 is urged to the right by this fluid pressure, thereby lifting member 17 from the abutment shoulder 21 and permitting the differential piston 3 to act during normal brake operation, only against spring 9. Piston 16, however, co-operates with the stop 22 which determines the location of transition point V as will be apparent hereinafter.

In the event of failure of the front-wheel brake system, the pressure in line 54 and chamber 15a falls rapidly so that spring 13 and its member 17 bear in the direction of arrow A against the shoulder 21, thereby applying the full force of the regulating and auxiliary spring against the differential piston 3. The force at the brake pedal required to shift the piston 3 from its position illustrated in FIG. 1 to close the valve 6 is thus increased as represented at VI and direct transmission of fluid pressure at the original rate continues over the stretch IV of the curve, i.e. until the brake force at the wheels increases by an amount VII, whereupon the transition point V is reached and valve 6 closes. Thus the rear-wheel brake has, for a given brake-pedal force, an augmented effect in the event of failure of the front-wheel brake system.

The invention described and illustrated is believed to admit of many modifications within the ability of persons skilled in the art.

I claim:

1. A brake system for an automotive vehicle having a set of front-wheel brakes with respective wheel-brake cylinders and a set of rear-wheel brakes with respective wheel-brake cylinders, comprising:

master-cylinder means having a pair of sections for respectively pressurizing the wheel-brake cylinders of said sets of brakes;

respective fluid-transmission networks connecting each of said sections with the respective wheel-brake cylinders of the corresponding set of wheel brakes;

a brake-force regulator in the fluid-transmission network of the rear-wheel brakes including a spring-biased pressure-responsive valve arrangement for diminishing fluid-force transfer from the respective section of said master-cylinder means to the wheel-brake cylinders of said rear-wheel brakes at a transition point after an initial period of substantially direct force transmission between the respective section of said master-cylinder means and the wheel-brake cylinders of said rear-wheel brakes; and means including a spring-stressing piston responsive to the fluid pressure in said fluid-transmission network of said set of front-wheel brakes operatively connected to said regulator and acting upon the spring biasing said valve arrangement for delaying the point of transition to said reduced brake effectiveness of said regulator upon failure of said front-wheel brakes.

2. A brake system for an automotive vehicle having a set of front-wheel brakes with respective wheel-brake cylinders and a set of rear-wheel brakes with respective wheel-brake cylinders, comprising:

master-cylinder means having a pair of sections for respectively pressurizing the wheel-brake cylinders of said sets of brakes;

respective fluid-transmission networks connecting each of said sections with the respective wheel-brake cylinders of the corresponding set of wheel brakes;

a brake-force regulator in the fluid-transmission network of the rear-wheel brakes for diminishing fluid-force transfer from the respective section of said master-cylinder means to the wheel-brake cylinders of said rear-wheel brakes at a transition point after an initial period of substantially direct force transmission between the respective section of said master-cylinder means and the wheel-brake cylinders of said rear-wheel brakes; and means responsive to the fluid pressure in said fluid-transmission network of said set of front-wheel brakes operatively connected to said regulator for delaying the point of transition to said reduced brake effectiveness of said regulator upon failure of said front-wheel brakes, said brake-force regulator comprising:

housing means provided with an axially extending bore, a differential piston subdividing said bore into a first working chamber and a second working chamber, said piston having a relatively small effective surface area exposed to fluid pressure in said first chamber and a relatively large surface area exposed to fluid pressure in said second chamber whereby fluid pressure in said chambers applies a force to said piston in one direction, means connecting said first chamber with said master-cylinder means and for connecting said second chamber with the wheel-brake cylinders of said set of rear-wheel brakes, spring means biasing said differential piston in another direction opposite said one direction, and valve means interconnecting said chambers and closable upon movement of said piston in said one direction at said transition point to prevent fluid flow between said chambers and effect force transmission therebetween in accordance with the relative effective surface areas of said differential piston exposed to fluid in said chambers.

3. The brake system defined in claim 2 wherein said means responsive to the fluid pressure in said fluid-transmission network of said set of front-wheel brakes includes piston means in said housing means responsive to the fluid pressure in the transmission network of said set of front-wheel brakes and effective under the latter pressure to relieve at least part of the force of said spring means in said other direction on application to said differential piston.

4. The brake system defined in claim 3 wherein said spring means includes a coil spring in said housing means generally coaxial with said differential piston, a force-transmission member forming a set for said coil spring and urged thereby against said differential piston in said other direction, said differential piston being engageable by said member in said other direction, said member being shiftable in said one direction without entrainment of said differential piston, said piston means acting upon said member in said one direction to urge it out of engagement with said differential piston upon pressurization of said piston means by the fluid transmission network of said set of front-wheel brakes.

5. The brake system defined in claim 4 wherein said spring means includes a regulating coil spring received in said housing means and bearing axially upon said differential piston, the first-mentioned coil spring forming an auxiliary spring coaxial with said regulating spring, said regulating and auxiliary springs being axially remote from said differential piston upon said housing means, said differential piston having an extremity defining a shoulder, said member being axially slidable on said extremity and engageable with said shoulder in said other direction, said regulating spring bearing upon said extremity.

6. The brake system defined in claim 5 wherein said piston means includes an annular piston coaxially surrounding and slidably mounted upon said differential piston proximal to said extremity, said housing means defining a third working chamber along said bore within which said annular piston is axially shiftable, said regulator further comprising means connecting said third chamber with said transmission network of said front-wheel brakes.

7. The brake system defined in claim 6 wherein said housing means has an annular throat surrounding said differential piston and separting said first chamber from said third chamber, and an annular steal seated in said throat and hugging said differential piston.

8. The brake system defined in claim 6, further comprising stop means on said housing means engageable by said piston means upon movement thereof in said one direction to render said piston means ineffective after a predetermined stroke of said differential piston.

9. The brake system defined in claim 8 wherein said valve means includes a valve chamber formed in said differential piston between said first and second chambers; a valve member axially shiftable in said differential piston and projecting therefrom, respective passages connecting said valve chamber with said first and second chambers, a valve spring in said differential piston urging said valve member in said other direction against a wall of said bore and in a direction such as to block fluid flow through said passages and said valve chamber, said regulating and auxiliary springs being of greater force than said valve spring and biasing said valve member out of the flow-blocking position until said differential piston is shifted away from said wall, and means for adjustable prestressing said auxiliary and regulating springs.

References Cited
UNITED STATES PATENTS 3,232,676   2/1966   Cripe.
3,290,882   12/1966   Oberthür _____ 60—54.5
3,368,350   2/1968   Cripe.

MILTON BUCHLER, Primary Examiner

J. J. McLAUGHLIN, Jr., Assistant Examiner

U.S. Cl. X.L.

60—54.5; 137—505.14, 505.25; 188—152; 303—84